United States Patent
Goers et al.

(10) Patent No.: US 10,688,375 B1
(45) Date of Patent: Jun. 23, 2020

(54) TIMING APPARATUS FOR TIMING COMPETITIONS

(71) Applicants: Aaron Goers, Castle Rock, CO (US); John Lawrence Goers, Centennial, CO (US)

(72) Inventors: Aaron Goers, Castle Rock, CO (US); John Lawrence Goers, Centennial, CO (US)

(73) Assignee: SPEED STACKS, INC., Englewood, CO (US)

(*) Notice: Subject to any disclaimer, the term of this patent is extended or adjusted under 35 U.S.C. 154(b) by 0 days.

(21) Appl. No.: 16/684,377

(22) Filed: Nov. 14, 2019

Related U.S. Application Data (63) Continuation of application No. 16/682,393, filed on Nov. 13, 2019.

(51) Int. Cl.
*A63B 71/06* (2006.01)
*G04F 10/00* (2006.01)

(52) U.S. Cl.
CPC .......... *A63B 71/0686* (2013.01); *G04F 10/00* (2013.01)

(58) Field of Classification Search
CPC ..... A63B 71/0686; A63B 67/00; A63B 71/00; G04F 10/00; G04F 8/00; G04B 47/00
USPC ................ 368/1–10, 110–113; 273/441, 445
See application file for complete search history.

(56) References Cited

U.S. PATENT DOCUMENTS

| | | |
|---|---|---|
| 3,649,010 A | 3/1972 | Jeffrey et al. |
| 3,878,675 A | 4/1975 | Produk |
| 4,220,330 A | 9/1980 | Montgomery |
| 4,392,176 A | 7/1983 | Kneip et al. |
| 4,398,834 A * | 8/1983 | Wakai ............ G04G 5/04 368/223 |
| 4,518,266 A | 5/1985 | Dawley |
| 4,586,709 A | 5/1986 | Godinet |
| 4,700,369 A | 10/1987 | Siegal et al. |
| 4,703,930 A | 11/1987 | Gilbert |
| 4,818,234 A | 4/1989 | Redington et al. |
| 5,019,950 A | 5/1991 | Johnson |
| 5,057,965 A | 10/1991 | Wilson |
| 5,652,975 A | 8/1997 | Hoskin |
| 5,838,638 A | 11/1998 | Tipton et al. |
| 5,844,861 A | 12/1998 | Maurer |
| 5,933,102 A | 8/1999 | Miller et al. |
| 6,181,647 B1 | 1/2001 | Tipton et al. |
| 6,229,764 B1 | 5/2001 | Tongue |
| 6,940,783 B2 | 9/2005 | Fox et al. |
| 7,042,806 B2 | 5/2006 | Fox et al. |

(Continued)

OTHER PUBLICATIONS

U.S. Appl. No. 16/682,393, filed Nov. 13, 2019, Goers et al.

(Continued)

*Primary Examiner* — Edwin A. Leon
(74) *Attorney, Agent, or Firm* — Sheridan Ross P.C.

(57) ABSTRACT

Systems, methods and devices for timing manual dexterity and hand-eye coordination competitions are provided. In various embodiments, the present disclosure relates to an apparatus and method for timing cup stacking competitions. The present disclosure includes a timer for timing various competitions and wherein the timer comprises a plurality of trigger points or touch points to ergonomically require a user to perform certain actions to activate and operate the timer.

16 Claims, 7 Drawing Sheets

(56) References Cited

U.S. PATENT DOCUMENTS 7,145,551 B1 * 12/2006 Bathiche .............. G06F 3/0346
                                                      345/158

OTHER PUBLICATIONS

U.S. Appl. No. 29/713,059, filed Nov. 13, 2019, Goers et al.
Notice of Allowance for Canadian Patent Application No. 2489442, dated Apr. 1, 2011, 2 pages.
International Search Report for International (PCT) Patent Application No. PCT/US2003/017673, dated Aug. 6, 2004, 2 pages.
Notice of Allowance for European Patent Application No. 03734409.0, dated Aug. 28, 2008, 1 page.
International Search Report for International (PCT) Patent Application No. PCT/US2005/047110, dated Mar. 31, 2006, 1 page.
Official Action for U.S. Appl. No. 10/172,652, dated Mar. 12, 2004, 9 pages.
Official Action for U.S. Appl. No. 10/172,652, dated Aug. 11, 2004, 8 pages.
Notice of Allowance for U.S. Appl. No. 10/172,652, dated Feb. 11, 2005, 4 pages.
Official Action for U.S. Appl. No. 11/026,626, dated Mar, 28, 2005, 5 pages.
Official Action for U.S. Appl. No. 11/026,626, dated Sep, 9, 2005, 7 pages.
Notice of Allowance for U.S. Appl. No. 11/026,626, dated Dec. 19, 2005, 6 pages.
Notice of Allowance (with English translation) for Chinese Patent Application No. 201930688373.6, dated Apr. 3, 2020, 4 pages.

\* cited by examiner

TIMING APPARATUS FOR TIMING COMPETITIONS

This U.S. Continuation Patent Application claims the benefit of priority to U.S. Non-Provisional patent application Ser. No. 16/682,393, filed Nov. 13, 2019, the entire disclosure of which is incorporated by reference for all purposes.

FIELD OF THE INVENTION

This application relates generally to an apparatus and method for use in timing competitive play and more specifically to an apparatus for use in the timing of sport stacking and cup stacking competitions.

BACKGROUND OF THE INVENTION

Cup stacking first became popular in the mid-1990s as a method of teaching physical coordination, including hand-to-eye coordination, to youngsters. Cup stacking helps students use both sides of their bodies and brains, develop ambidexterity, develop quickness, and improve concentration. Cup stacking also helps teach sequencing and patterning, which can help in developing math and reading skills. Since the mid-1990s, the sport has grown in popularity throughout the world, primarily in elementary schools, where it has become a part of many physical education programs, afterschool, and sports programs. The sport involves stacking and unstacking a set of specially designed cups in pre-arranged sequences while being timed. The object of the competitions is to complete the sequence in as short a time as possible. There are several standard sequences and the competitions can be performed by an individual or by a team in a relay fashion. Timing of the competition has conventionally been performed by a judge with a stopwatch. The competitor begins with both hands face down on the table where the cups are to be stacked. The judge gives a verbal cue, usually "Ready, Get Set, Go", starting the stopwatch on the word GO. Time is stopped when the sequence is completed.

One of the major drawbacks to the sport has been the inaccuracy associated with having different individuals time the competitors using stopwatches. Errors in timing due to variations in human reaction time often exceed several tenths of a second and are significant (as much as 10% off) when measuring competitive times. Competitive times in this sport range from 2 to 15 seconds with winners of the competition usually determined thousandths of seconds. To mitigate against the human reaction time, in final competitions, three judges are used and the high and low times are not counted against the competitor. This measure, however, is inefficient and does not cure the inaccuracies inherent with using human judges since the measured time to complete the sequence is still subjective.

U.S. Pat. Nos. 6,940,783 and 7,042,806, the disclosures of which are incorporated herein by reference, disclose a mat for timing competitions. The teachings of these patents address the timing problem discussed above. The disclosures of these patents include a timing mechanism. The timing mechanism may be incorporated into a mat or otherwise be associated with the mat. In either case, the timing mechanism mitigates the inaccuracies associated with utilizing human judges. In particular, these patents teach a trigger means with a timing means operatively connected to the trigger means. The trigger may be pressure or touch sensitive so that the timer begins to accrue time with a first activation of the trigger and stops with a second activation of the trigger. This timing approach is implemented such that the timer requires the competitor to place both hands on the timer to start it and both hands on the timer again to stop it after completing the sequence. This type of timer has two separate pads to sense the presence of each of the competitor's hands and these pads activate an electronic timing circuit within the timer. By requiring both of the competitor's hands to be engaged with the timer before and after the stacking sequence, the timer prevents competitors from gaining an advantage by starting the timer after the stacking sequence has begun or stopping the timer before the stacking sequence is completed.

As used herein, the terms "sport stacking" and "cup stacking" may be used interchangeably. Sport stacking is often used as a broader term and includes but is not limited to cup stacking. Embodiments and features of the present disclosure are well suited to sport stacking, but it should be recognized that they may be used for various competitions and timing competitions. Embodiments and features of the present disclosure are not limited to timed stacking competitions.

However, there remain disadvantages associated with the trigger-based timing approach discussed above. In particular, one of the rules in cup stacking is that the competitor can activate the two pads with any part of their hand as long as it is above the wrist and so competitors usually activate the timer using the part of their hand that is as close to the wrist as possible, which allows the rest of their hands to be as close to the cups as possible. Other sport stacking rules prohibit the competitor from holding the cups before the timer is started and from holding the cups when the timer is stopped. During official competition, competitor's stacking attempts are evaluated by a judge and are also video recorded and evaluated in slow motion at a later time by officials to look for infractions of these and other rules.

As the sport has matured, competitors have become so fast that live judges at the competition cannot accurately determine whether or not a competitor's hands are holding the cups when the timer is stopped. Even high-speed video played frame by frame cannot consistently confirm compliance with this rule. Therefore, an improved timer design that prevents the competitor's hands from holding the cups when the timer is started and stopped would improve the sport by relieving judges from monitoring for this rule and would eliminate the need to video review these parts of the sequence, saving time and money.

The timing device described above has also been adopted for use in other competitions, such as competitive cubing, where competitors compete for time to solve a combination or sequential move puzzle such as a Rubik's Cube. These timing devices are well suited for competitive cubing because the same requirement for a competitor's hands to be in a known position prior to and following the solving of the puzzle also apply. However, problems with a competitor's hands holding the puzzle before the timer is started or after the timer is stopped have not developed in competitive cubing because other rules prevent them from occurring. Therefore, an improved device for cup stacking should ideally be designed with an alternate mode for use with competitive cubing in which only two of the touchpads are active, including an ability to switch between these modes.

Because timers used for both cup stacking and competitive cubing are often connected to remote displays so that spectators and judges can see the resulting time of each competitor, an improved timing device should include a feature which indicates on the remote display which mode of operation the timer is set to. For example, in one embodiment, the timer could blink the time being displayed on the timer's LCD display and on the remote display whenever the timer is in a mode intended for competitive cubing competitions, where only two of the touchpads are active. The resulting time would not blink when the timer is set to the mode in which all touchpads are active.

SUMMARY

It should be understood that the present disclosure provides methods and systems for timing competitions, particularly, competitions focusing on hand eye coordination and manual dexterity and, more particularly, cup stacking competitions and competitive cubing competitions. The description which follows describes preferred embodiments of the disclosure, and various alternative embodiments. It should be readily apparent to those skilled in the art, however, that various other alternative embodiments may be accomplished without departing from the spirit or scope of the disclosure.

In various embodiments, timing devices are provided that comprise at least one trigger mechanism having at least four triggers. The trigger mechanism is connected to a timer mechanism. The trigger mechanism starts and stops the timer. Each trigger can be any type of trigger that will start and stop a timer, including but not limited to capacitive switches, inductive switches, photoelectric or photo optic sensors, dry contact switches or conductive contact points. In various embodiments, the trigger comprises one or more of: 1) a low profile so that the trigger(s) does not interfere with cup stacking; 2) tuned to filter out false signals, such as a cup being placed on the trigger; 3) covered with a film or other covering to keep the trigger safe from environmental conditions; 4) small amounts of pressure should be sufficient for the trigger to operate; and 5) be inexpensive. It has been found that a capacitive touch trigger or pressure sensitive trigger works well with the present disclosure and is contemplated for use with various embodiments described herein.

In one embodiment, each of the at least four triggers must be activated at substantially the same time in order to start or stop the timer. The goal of the at least four triggers is to require that a competitor's thumb and fingers are all in contact with the triggers so that the competitor may not touch the cups while activating the triggers. It has been found that, for the purposes of cup stacking competitions, four touch pad triggers work well. However, it should be noted that more or fewer than four touch pad triggers can be used with the present disclosure. In one embodiment, a top left trigger is activated by the fingers of the left hand, a top right trigger is activated by the fingers of the right hand, a back left trigger is activated by the left thumb, and a back right trigger is activated by the right thumb. Thus, embodiments of the present disclosure comprise various sensors on the backside of the timer to detect the presence of each of the competitor's thumbs as well. Because the competitor's thumbs must be engaged on the backside of the timer to stop or pause the timer, it is impossible for the competitor's hands to simultaneously hold the cups, ensuring compliance with the stopping rule. Similarly, since the competitor's thumbs must be in contact with the backside of the timer in order to start it, the competitor's hands are prevented from holding the cups prior to starting the timer. Use of this improved timer for sport stacking competitions eliminates or reduces the need for live judging or subsequent video review of the starting and stopping portions of the stacking sequence thereby ensuring a more level playing field for competitors.

In one embodiment, the touch pad triggers are formed by printing conductive ink traces to the backside of a film covering. The traces conduct a signal generated from the touch pad triggers to a timer. The trigger area is formed by increasing the circular area of the trace. Thus, in this embodiment, the trigger is part of the trace. Wires are connected to the traces to conduct the signals generated to the timer.

The timer mechanism can be any kind of timer that meets the following criteria: 1) is capable of timing to at least 0.01 seconds; 2) able to be started and stopped by the competitor without reliance on any third party; 3) predictable, repeatable, reusable, and reliable; 4) does not interfere with the stacking process; and 5) able to be operated using a free standing power source, such as batteries, for long periods of time without resort to auxiliary power sources. A timer found suitable for use with the present disclosure includes a timer constructed from standard electronic components, including a microprocessor to accurately keep time, an LCD display, one or more discrete light emitting diode(s), a reset switch, a power switch and a power source. The power switch is shown in the figures as a toggle switch; however, it should be noted that type of switch is appropriate for use in the present disclosure. It may be preferable to have the power switch and the reset switch be different types of switches so that competitors and judges do not get confused over which switch accomplishes which function. The timer is, preferably, powered by batteries to allow for maximum portability; however, the timer can incorporate a power coupling to allow the timer to be connected to a power supply or other suitable power source.

Each embodiment described herein solves the timing problem described above. Each of the embodiments includes a timer mechanism. In one embodiment, the timing mechanism comprises a display operable to indicate an elapsed time, and a plurality of trigger members; wherein the plurality of trigger members comprises at least three spaced apart triggers; wherein the display is operatively connected to the plurality of trigger members and wherein a first activation of the plurality of trigger members starts a timer and a second activation of the plurality of trigger members stops the timer; and wherein the first activation and the second activation require substantially simultaneous contact with the plurality of trigger members.

In another embodiment, the timer mechanism comprises a display operable to indicate an elapsed time, and a plurality of trigger members; wherein the plurality of trigger members comprises at least four spaced apart triggers; wherein the timer mechanism is configured to operate in at least a first mode and a second mode, wherein in the first mode, a first activation of the at least four triggers starts a timer and a second activation of the at least four triggers stops the timer, wherein the first activation and the second activation require substantially simultaneous contact with the at least four triggers; and in the second mode, a first activation of at least two of the at least four triggers starts a timer and a second activation of the at least two of the at least four triggers stops the timer, wherein the first activation and the second activation require substantially simultaneous contact with the at least two of the at least four triggers.

Another embodiment comprises a timer mechanism comprising a display operable to indicate an elapsed time, and a plurality of trigger members, wherein the plurality of trigger members comprises at least three spaced apart triggers, wherein the display is operatively connected to the plurality of trigger members and the trigger members are operable to control the display; and a mat for selectively receiving the timer mechanism, wherein the mat comprises at least one male extension operable to be received by the timer mechanism; wherein a bottom surface of the timer mechanism comprises at least one female aperture operable to receive the at least one male extension of the mat.

In some embodiments at least one trigger member comprises a pressure sensitive switch, a capacitive switch, a photo optic or photo electric switch, or a dry contact switch. In some embodiments the timer mechanism comprises at least one female aperture operable to receive at least one male extension. In some embodiments the trigger members comprise at least a top left trigger, a top right trigger, a back left trigger, and a back right trigger. In some embodiments the timer mechanism comprises a microprocessor, an LCD display, a plurality of light emitting diodes, a reset switch, a power switch, and a power source. In some embodiments the timer mechanism is configured to operate in a plurality of operating states, and the timer mechanism comprises a multi-color light emitting diode for indicating one of a plurality of operating states of the timer mechanism. In some embodiments the timer mechanism comprises a data port enabling data associated with the timer mechanism to be displayed on an external display, and wherein the operating state of the timer is indicated by an indicia on at least one of the timer mechanism display or the external display.

These and other objects, features, and advantages of the disclosure will become apparent from the following best mode description, the drawings and the claims.

BRIEF DESCRIPTION OF THE DRAWINGS

The figures which follow depict a preferred embodiment, and may depict various alternative embodiments. The disclosure is not limited to the embodiment or embodiments depicted herein since even further various alternative embodiments will be readily apparent to those skilled in the art. For the ease of the reader, like reference numerals in various drawing figures refer to identical structural elements or components.

DETAILED DESCRIPTION

Figure 1:
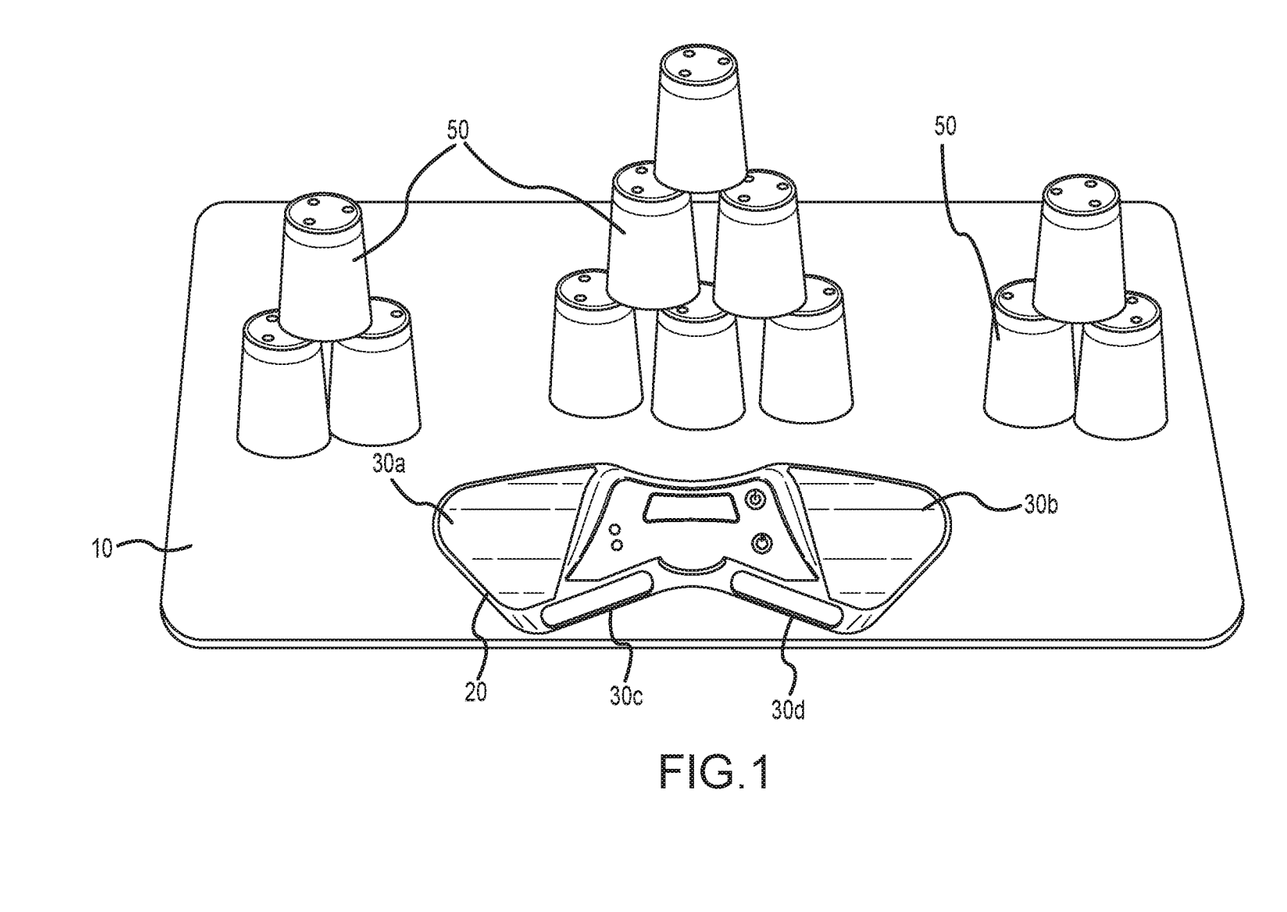
FIG. 1 depicts a top perspective view of one embodiment of the present disclosure in conjunction with other components used in cup stacking competitions.

As shown in FIG. 1, an exemplary cup stacking system is comprised of a mat 10, a timer 20, and a plurality of cups 50. FIG. 1 depicts a set of twelve cups arranged in the 3-6-3 position. FIG. 1 shows the timer 20 as a separate unit from the mat, while the triggers 30a, 30b, 30c, and 30d are incorporated into the timer. It should be noted that the triggers can be a separate unit from the timer. It should also be noted that the triggers can be incorporated into the mat. It should also be noted that the triggers and the timer can be incorporated into the mat to form an integral unit. A competitor begins with both hands on the timer 20 and activates the triggers 30a, 30b, 30c, and 30d to start the timer. Once the triggers are activated and the timer starts, the hands may be removed from the timer to manipulate the cups 50. Once the cups 50 are arranged in the proper orientation based on the rules of the competition, the competitor's hands are returned to the triggers 30a, 30b, 30c, and 30d to stop the timer.

Figure 2:
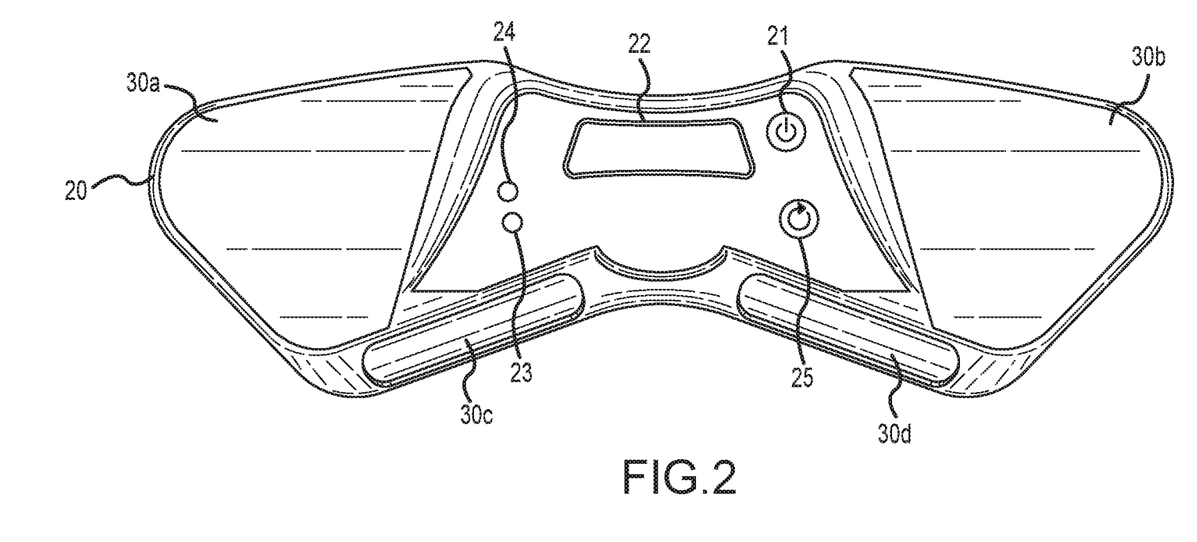
FIG. 2 depicts a top view of one embodiment of the present disclosure.

FIG. 2 shows a timer 20 of one embodiment of the present disclosure. The timer 20 in FIG. 2 is shown separated from a mat for illustrative purposes. The timer has a power switch 21, which can be any kind of switch that will allow electricity to flow through the circuit board and the various elements of the timer. The timer 20 has a readout display 22 where time is displayed. The timer 20 has touch pad triggers 30a, 30b, 30c, 30d which are connected to an interior timer mechanism through interior wire connectors. This connection may be through wires or through conductive traces. In this embodiment, the triggers 30 comprise a top left trigger 30a, a top right trigger 30b, a back left trigger 30c, and a back right trigger 30d. In this embodiment top left trigger 30a is configured to be contacted with the fingers of the left hand, top right trigger 30b is configured to be contacted with the fingers of the right hand, back left trigger 30c is configured to be contacted with the left thumb, and back right trigger 30d is configured to be contacted with the right thumb.

In this embodiment, the bottom surface of the timer is configured to rest substantially flat on a horizontal surface such as a table or mat. The timer is configured to be used with the back left trigger 30c and the back right trigger 30d facing the competitor. The timer is substantially horizontally symmetrical from the perspective of the competitor with respect to an axis that runs parallel to the bottom surface from the side of the timer facing the competitor to the side of the timer facing away from the competitor. The shape of the timer comprises two lobes extending horizontally from the axis such that the timer is wider at the side facing away from the competitor than it is at the side facing the competitor. The display 22 is tilted such that, from the competitor's perspective, the near edge of the display is lower than the far edge of the display. The top left trigger 30a and the top right trigger 30b are substantially parallel to the bottom surface but may be slightly inclined. The back left trigger 30c and the back right trigger 30d have a generally perpendicular orientation to the bottom surface but are inclined such that, from the competitor's perspective, the near edge of each trigger is lower than the far edge of each trigger. The overall shape and orientation of the timer and its components are designed to accommodate the shape of the competitor's hands when the fingers are placed on the top left trigger 30a and top right trigger 30b and the thumbs are placed on the back left trigger 30c and the back right trigger 30d. Further, the triggers are spaced apart to accommodate the display and other controls of the timer.

The timer 20 has, in this embodiment, an LED 23 that is operable to illuminate when pressure is sensed by all four triggers. Alternatively, multiple indicator LEDs may be used, each of which corresponds to one of the touch pad triggers, and will illuminate when contact is sensed by a touch pad trigger. When the touch pad triggers 30 are contacted for longer than a preset interval, an arming LED 24 is illuminated. The arming LED 24 indicates to a competitor or observer that the timer is ready and the competition can begin. The timer 20 is triggered or initiated by releasing the touch pad triggers 30. The timer 20 is stopped by applying pressure again to the touch pad triggers 30. The timer can be reset by utilizing a reset switch 25. The reset switch can be a push button, a flip switch or any other appropriate switch.

A competitor will use the timer by first placing both hands on the touch pad triggers 30 such that all four triggers are in contact with the competitor's hands. Indicator lamp or LED 23 will light up to show that each touch pad has been activated. Once both hands are in place for a full second, an arming lamp or light emitting diode 24 is illuminated to show that the timer is armed and ready for the competitor to begin. Although this embodiment utilizes LEDs to show the competitor that the timer is armed and ready to begin, one of skill in the art can envision other means of notifying the competitor that the timer is armed, including but not limited to an audible or visual indicator or a flashing light, or an indicator on the LCD screen.

The competitor's hands will then leave the touch pad triggers, starting the timer. A readout display 22 indicates the amount of time that has passed. Once the sequence has been completed, both of the competitor's hands must again rest on the touch pad triggers such that all four triggers are in contact with the competitor's hands. This will stop the timer. The final time remains on the readout display to allow the time to be recorded. To begin another timed sequence, the competitor or a judge pushes a reset button 25.

It should be appreciated that the timer could easily be connected, in any suitable manner, to remote time display devices that would display time, compute time or store time, such as a computer, or other electronic device that displays, analyzes, and/or stores information (a tablet, laptop, etc.). In such an arrangement, a wireless link (Bluetooth or WiFi, for example) or a data cable, such as a USB cable, is contemplated to connect the timer to a remote display, computer, or other device (not shown). A computer program can direct the computer to begin accruing time when the trigger is activated, to stop accruing time when the trigger is reactivated, or the remote display could simply display the time as calculated by the timer. Once time is stopped, the computer program could direct the judge or competitor to store the time or to delete the time or display other information, such as timer mode.

In various embodiments, timing devices are provided that comprise at least two different modes of operation and wherein the timing devices are selectively provided n a mode of operation (e.g. two-pad and four-pad operation). Devices of the present disclosure including timers and timing display devices are operable to provide a visual indicia to one or more users regarding the mode of operation in which at least one timing device is provided. In one embodiment, when the timer is connected to a remote display, a format of a data stream sent from the timer to a remote display is used to indicate the current operating mode. For example, when the timer is in a mode in which only two of the touchpads are active, the timer's LCD display blinks at least upon stopping or displaying a final time. The data stream sent to the remote display is formatted such that the remote display blinks (e.g. three times). In some embodiments, when the timer is operating in a mode in which all touchpads are active, the display does not blink and the data stream to the remote display is formatted such that the remote display does not blink, thereby indicating no "irregularities" in the timing activity.

In addition to or in lieu of blinking or flashing the time to provide an indicia, embodiments of the present disclosure contemplate the provision of a light or similar indicia. For example, a final time is contemplated as being provided on a display with a further indicia of the mode of operation (e.g. 2 lights for 2-mode and 4 lights for 4-mode). Such embodiments allow for observers to quickly assess whether or not a timing device was provided in a correct mode and generally provides additional information to users and spectators.

Figure 3:
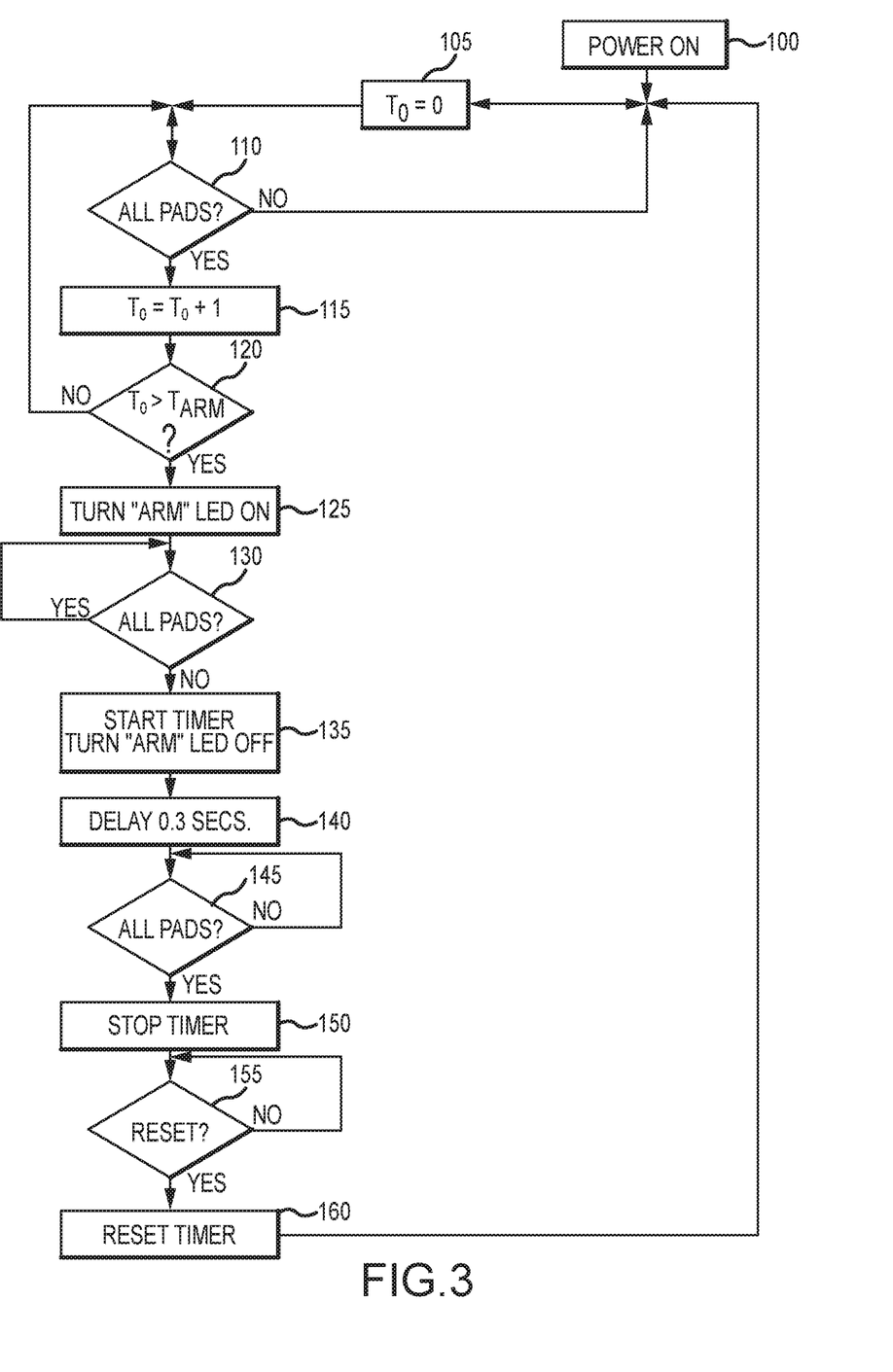
FIG. 3 depicts a flowchart of the operation of the timer of one embodiment of the present disclosure.

The flowchart for the timing mechanism of one embodiment is shown in FIG. 3. The power is turned on in step 100. The timer then sets a variable $T_0$ to be zero in step 105. When the variable, $T_0$ is zero, the LED is off. The touch pad triggers are activated by placing the hands of the competitor on or over the triggers such that all four triggers are in contact with the competitor's hands and the microprocessor of the timer analyzes whether all four touch pad triggers are activated, step 110. When all four triggers are activated, the microprocessor adds 1 to the value of $T_0$ in step 115, then compares the value of $T_0$ to another preset variable, $T_{arm}$, in step 120. The microprocessor then determines whether $T_0$ is greater than $T_{arm}$, step 120. If not, the microprocessor reverts to step 110. If $T_0$ is greater than $T_{arm}$, the microprocessor directs current to the "ARM" light emitting diode, illuminating the diode, as shown in step 125. If not, the process begins again at step 110 until both pads have been activated for the required time $T_{arm}$.

The hands must be removed from all four triggers in order to move from the "ARM" state to accruing time. The "ARM" LED is the signal for the competitor that the timer is ready to begin timing as soon as the competitor is ready. Once the competitor notices the illumination of the "ARM" LED, the competitor is then free to remove their hands from the touch pad triggers. Then, the microprocessor checks whether all four touch pad triggers are activated, in step 130. If all pads are not activated, the "ARM" LED is turned off and the timer is started, step 135. A delay is built into this embodiment, step 140. This delay prevents errant starting of the timer by the competitor if the competitor's hands were to leave the pads for less than 0.3 seconds. The delay of 0.3 seconds shown in step 140 is a debounce timer that does not affect the accumulating time of the competitor. The purpose of the delay is to eliminate errant STOP signals that could occur as the competitor's hands are leaving the triggers. Since actual competitive times of less than 0.3 seconds are not likely, the delay does not interfere with the function of the device and does not affect the measured time.

When the touch pad triggers are reactivated, the microprocessor checks to ensure that reactivation occurs on all four touch pad triggers, step 145. If not, the timer keeps accruing time. If so, the timer is stopped, step 150. The final time is displayed on the display readout until the reset button is pressed, steps 155 and 160. Once the timer is reset, the variable $T_0$ is set back to zero and the timer is ready to time another competition.

In another embodiment, the timer may operate in a two-trigger mode, in which only two of the four triggers must be activated to start or stop the timer. This mode may be suitable, for example, for competitive activities such as competitive cubing in which easily verifiable rules prevent the user from improperly positioning the hands while starting or stopping the timer. In such competitions, additional touchpads for the thumbs are not required and in fact, would represent an unwelcome burden for competitors. Therefore, a timer design that has the ability to switch between two-pad mode and four-pad mode would have the advantage of being able to serve a variety of activities with a single device. In a preferred embodiment, in two-trigger mode the triggers that must be activated to start or stop the timer are the top left trigger and the top right trigger. However, the timer may be configured such that other pairs of triggers can be used in two-trigger mode. The timer may also be configured such that any two triggers can be used in two-trigger mode.

In the two-trigger embodiment, the improved timing device includes a switch to toggle between two-trigger mode and four-trigger mode. Switching between the modes may be accomplished with a discrete switch dedicated for this purpose or may be done by requiring the user to hold one or more existing buttons on the device for a specific period of time in order to toggle between modes, or may employ any other common approach for switching between modes.

Figure 4:
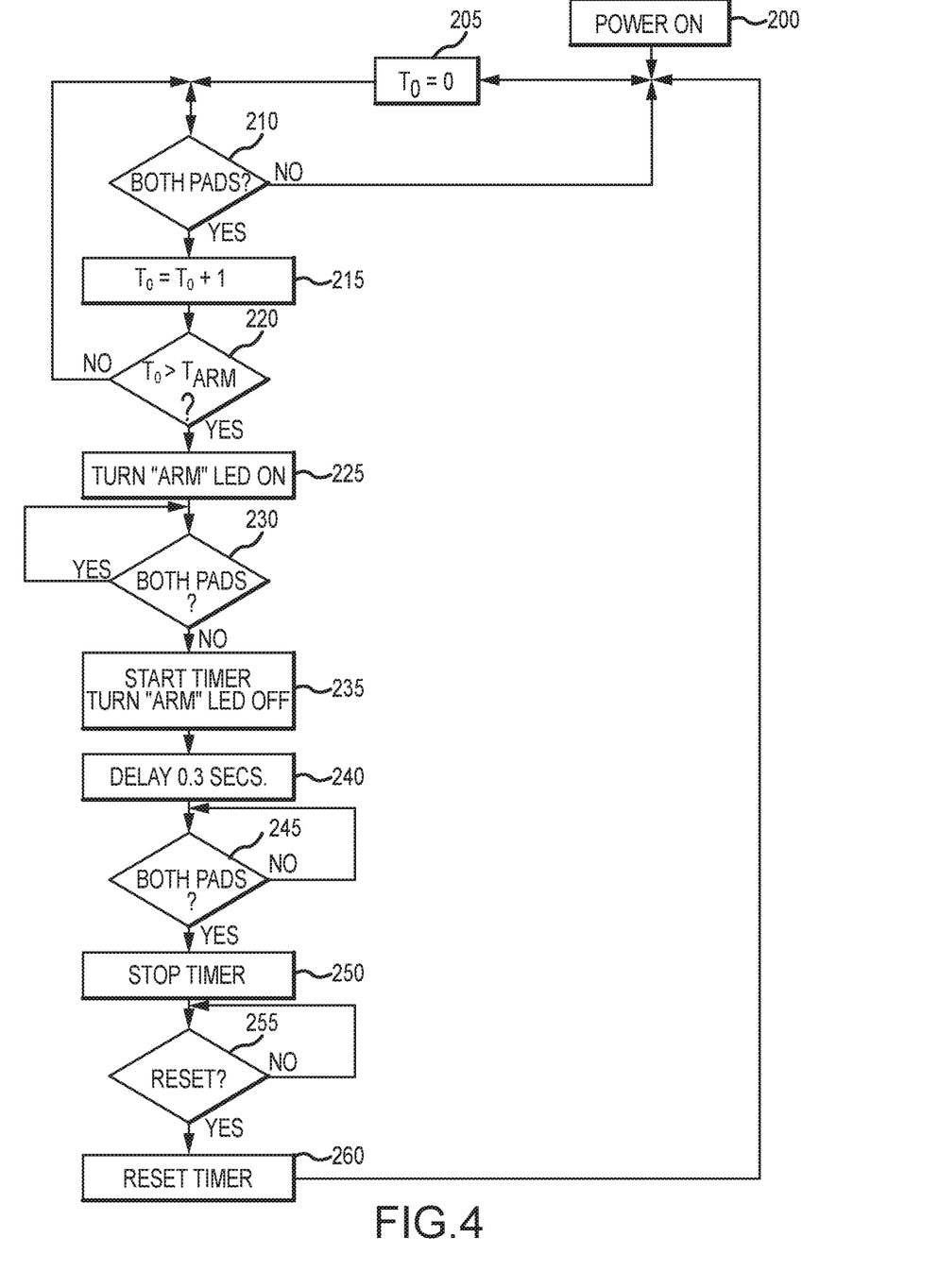
FIG. 4 depicts a flowchart of the operation of the timer of another embodiment of the present disclosure.

The flowchart for the timing mechanism operation in two-trigger mode is shown in FIG. 4. The power is turned on in step 200. The timer then sets a variable $T_0$ to be zero in step 205. When the variable, $T_0$ is zero, the light emitting diodes are off. The touch pad triggers are activated by placing the hands of the competitor on or over the triggers and the microprocessor of the timer analyzes whether both touch pad triggers are activated, step 210. When both triggers are activated, the microprocessor adds 1 to the value of $T_0$ in step 215, then compares the value of $T_0$ to another preset variable, $T_{arm}$, in step 220. The microprocessor then determines whether $T_0$ is greater than $T_{arm}$, step 220. If not, the microprocessor reverts to step 210. If $T_0$ is greater than $T_{arm}$, the microprocessor directs current to the "ARM" light emitting diode, illuminating the diode, as shown in step 225. If not, the process begins again at step 210 until both pads have been activated for the required time $T_{arm}$.

The hands must be removed from both pads in order to move from the "ARM" state to accruing time. The "ARM" LED is the signal for the competitor to begin the competition. Once the competitor notices the illumination of the "ARM" LED, the competitor is then free to remove both hands from the touch pad triggers. Then, the microprocessor checks whether both touch pad triggers are activated, in step 230. If the pads are not activated, the "ARM" LED is turned off and the timer is started, step 235. A delay is built into this embodiment, step 240. This delay prevents errant starting of the timer by the competitor if the competitor's hands were to leave the pads for less than 0.3 seconds. The delay of 0.3 seconds shown in step 240 is a debounce timer that does not affect the accumulating time of the competitor. The purpose of the delay is to eliminate errant STOP signals that could occur as the competitor's hands are leaving the triggers. Since actual competitive times of less than 0.3 seconds are not likely, the delay does not interfere with the function of the device and does not affect the measured time.

When the touch pad triggers are reactivated, the microprocessor checks to ensure that reactivation occurs on both touch pad triggers, step 245. If not, the timer keeps accruing time. If so, the timer is stopped, step 250. The final time is displayed on the display readout until the reset button is pressed, steps 255 and 260. Once the timer is reset, the variable $T_0$ is set back to zero and the timer is ready to time another competition.

In another embodiment, the timer uses a single, multi-color LED to indicate both the state of the timer as well as the current operating mode of the timer. One embodiment of this improved state and mode indicating system is as follows:

| Timer State | Light in Two-Pad Mode | Light in Four-Pad mode |
|---|---|---|
| Power OFF | OFF | OFF |
| Power ON | COLOR 1 | COLOR 2 |
| Hands on both pads | COLOR 3 | COLOR 3 |
| Hands on both pads for a preset amount of time - timer armed | COLOR 4 | COLOR 4 |
| Hands off - timer running | COLOR 4 BLINKING | COLOR 4 BLINKING |

Conventional devices for timing sport stacking competitions use a two-light system for indicating the various states of the timer as follows:

| Timer State | Red Light | Green Light |
|---|---|---|
| Power OFF | OFF | OFF |
| Power ON | OFF | OFF |
| Hands on both pads | ON | OFF |
| Hands on both pads for 1 sec - timer armed | ON | ON |
| Hands off - timer running | BLINKING | BLINKING |

The use of a single, multi-color LED system on the timer to indicate both the timer's state and operating mode reduces the cost to manufacture and improves the functionality by allowing additional information about the condition of the timer to be conveyed in one place and with a single device.

In another embodiment, it is recognized that the light indicating the mode be evident to the competitor as well as to spectators, judges and video recording devices. For example, judges should be able to confirm that the timer is being operated in four-trigger mode for sport stacking competitions, since operation in two-trigger mode would confer an advantage on a given competitor and might not otherwise be evident. In this embodiment, the timer includes a system for transmitting the light from the multi-color LED to an illuminating feature located in a highly visible area of the timer, for example, the top of the timer. This allows the user to confirm the state and mode of the timer but also makes the state and mode evident to judges, spectators and video recording devices. This improved visibility allows officials to verify the competitor's proper operation of the timer and to confirm its operating mode both during the competition and during subsequent video review.

In various embodiments, timer devices of the present disclosure provide an improved mechanism for attaching a timer to a mat. Timers used for sport stacking and competitive cubing are typically used in conjunction with a mat (see FIG. 1, for example). In sport stacking, the mat defines the bounds of the playing surface and also serves as a preferential stacking surface by reducing unwanted sliding and bouncing of the cups during the stacking sequence. Existing timers for both sport stacking and competitive cubing connect to the mat using a system where two buttons on the mat, each having a T-shaped cross section, slide into mating features on the timer. To attach the timer to the mat, the timer body is placed onto the mat with the two holes in the bottom of the timer aligned with the two buttons on the mat. The user then slides the timer to the right, which engages the T-shaped buttons with retaining features in the timer to secure it. While this sliding-type system allows for easy attachment and removal, it sometimes results in unintended detachment when side forces are inadvertently applied by the user.

Figure 5:
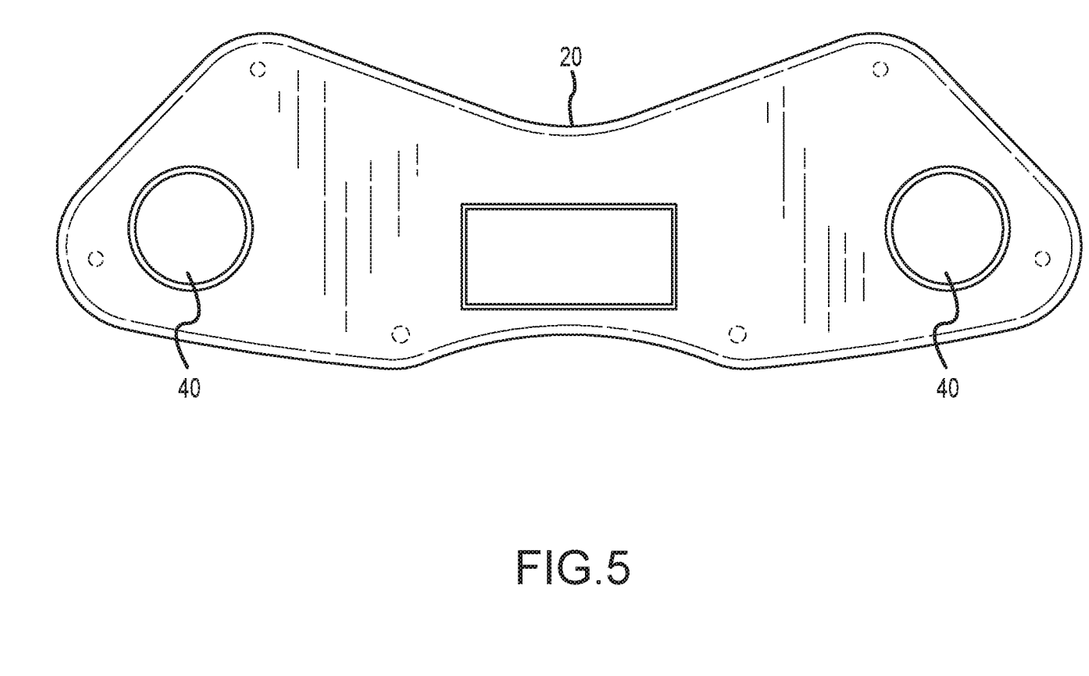
FIG. 5 depicts a bottom view of one embodiment of the present disclosure.

In this embodiment, illustrated in FIG. 5, an improved system for attaching the timer to a mat has been developed which prevents unwanted detachment of the timer from the mat. This embodiment includes features attached to the mat that snap into mating features 40 integrated into the timer body. This snap-in type approach prevents unwanted release due to side forces applied inadvertently by the user. Release due to side forces is prevented because the retaining features provide a rigid attachment in all axes, except when the timer is lifted straight up, away from the mat. In this upward axis, the timer has light detents (snap-in features) which are easily overcome when the timer is purposefully removed by the user. Upward forces are never encountered during use in either sport stacking or competitive cubing, even inadvertently, and as a result, this snap-in type system is much more immune to inadvertent detachment during use.

Figure 6:
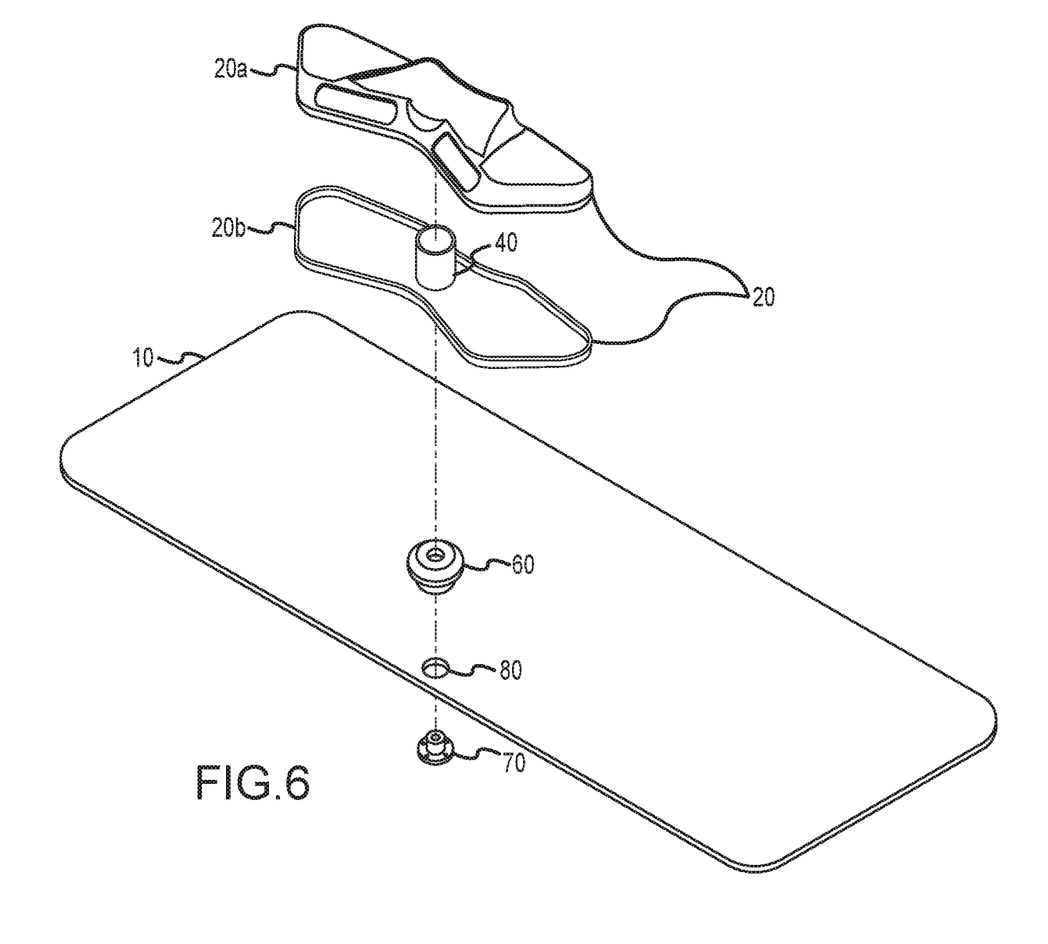
FIG. 6 depicts one embodiment of the present disclosure comprising a timer and a mat.

FIG. 6 is an exploded perspective view of a timing system including a mat 10 and a timer 20 according to one embodiment of the present disclosure. The timer comprises a timber body 20*a* and a timer base 20*b*. The mat includes a snap 60 that is configured to be inserted into a mating feature 40 of the timing device. The snap 60 is attached to the mat using a fastener 70 which connects to the snap through a hole 80. In this embodiment, the fastener 70 is a screw-type fastener. However, any suitable fastener can be used, including a snap, a bolt, or adhesive. The snap 60 may further be shaped or contoured such that when the snap 60 is engaged with the mating feature 40 the timer 20 cannot be rotated about the vertical axis. For example, a notch may be cut into the surface of snap 60 that matches a ridge in the interior of mating feature 40 such that when snap 60 is inserted into mating feature 40 the ridge is inserted into the notch, preventing rotational movement.

Figure 7:
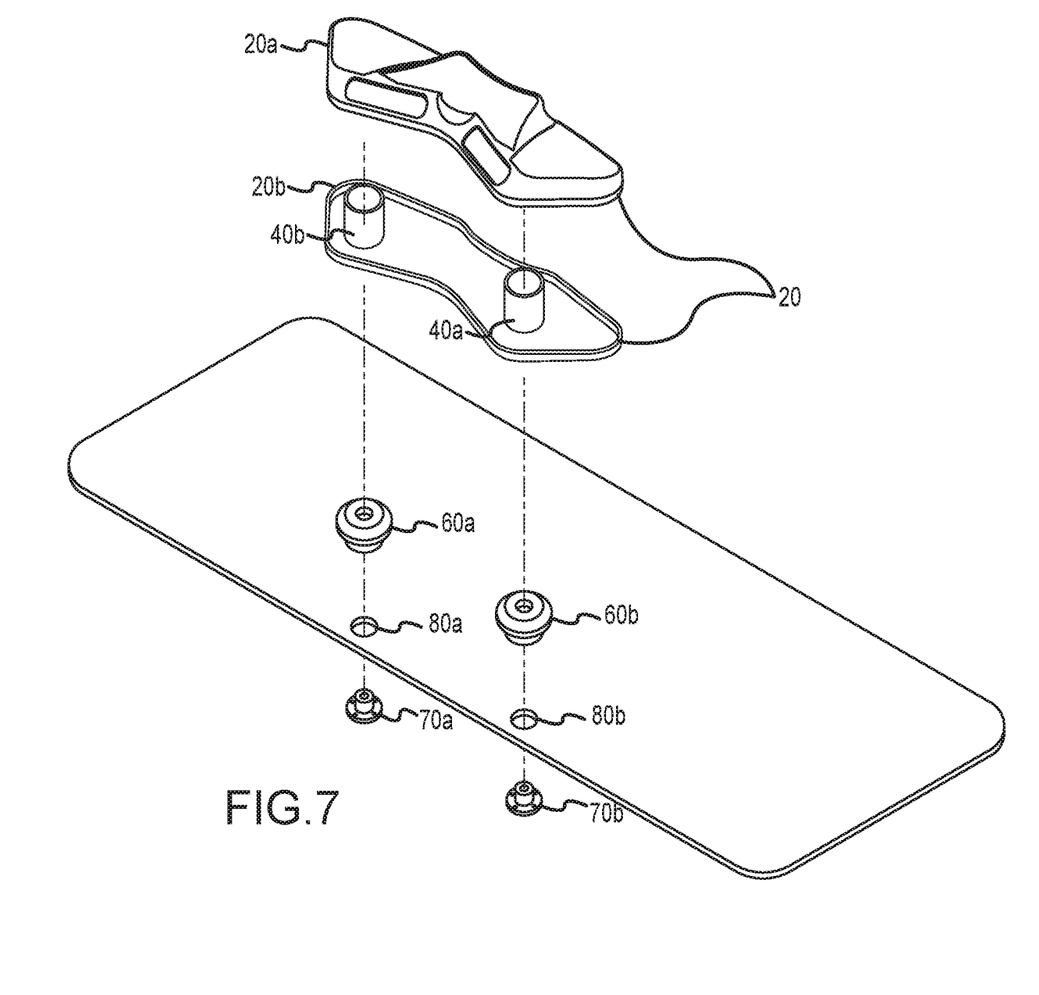
FIG. 7 depicts one embodiment of the present disclosure comprising a timer and a mat.

FIG. 7 discloses another example of a mat in this embodiment. The mat includes two snaps 60*a* and 60*b* that are configured to be inserted into two mating features 40*a* and 40*b* of the timing device. The snaps 60*a* and 60*b* are attached to the mat using fasteners 70*a* and 70*b* which connect to the snaps through holes 80*a* and 80*b*. In this embodiment, the fasteners 70*a* and 70*b* are screw-type fasteners. However, any suitable fastener can be used, including a snap, a bolt, or adhesive. In this embodiment, the use of two snaps prevents rotational movement around the vertical axis, and contouring the snaps 60*a* and 60*b* is unnecessary.

It will be recognized that the invention disclosed herein is suitable for a variety of competitive activities, including competitive speed cubing competitions, where competitors attempt to solve a Rubik's® cube or similar 3-D combination puzzle in as little time as possible ("speed cubing"). The reasons for using this type of timer in speed cubing are the same as for sport stacking; both of a competitor's hands are forced to be in a known position when starting and stopping the timer and are therefore prevented from being engaged with the puzzle.

It will be recognized that features of the various embodiments disclosed herein can be combined in a variety of ways to obtain various embodiments of the claimed invention.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. An apparatus for timing competitions comprising:
a timer mechanism having a substantially flat bottom surface, said timer mechanism comprising a display operable to indicate an elapsed time, and a plurality of triggers; wherein said timer mechanism is substantially symmetrical with respect to a first axis, and
said timer mechanism comprises two lobes extending horizontally from said first axis;
wherein the plurality of triggers comprises at least four spaced apart triggers; wherein the plurality of triggers comprises a first trigger on a first surface of a first lobe, a second trigger on a second surface of said first lobe, a third trigger on a first surface of a second lobe, and a fourth trigger on a second surface of said second lobe; wherein the display is operatively connected to the plurality of triggers and wherein a first activation of the plurality of triggers through physical contact starts a timer and a second activation of the plurality of triggers through physical contact stops the timer; wherein the first activation and the second activation require substantially simultaneous physical contact with at least two of the plurality of triggers.

2. The apparatus of claim 1, wherein at least one trigger comprises a pressure sensitive switch, a capacitive switch, a photo optic or photo electric switch, or a dry contact switch.

3. The apparatus of claim 1, wherein the timer mechanism comprises at least one female aperture operable to receive at least one male extension.

4. The apparatus of claim 1, wherein the timer mechanism comprises a microprocessor, an LCD display, a plurality of light emitting diodes, a reset switch, a power switch, and a power source.

5. The apparatus of claim 1, wherein the timer mechanism is configured to operate in a plurality of operating states, and the timer mechanism comprises a multi-color light emitting diode for indicating one of a plurality of operating states of the timer mechanism.

6. The apparatus of claim 5, wherein the timer mechanism comprises a data port enabling data associated with the timer mechanism to be displayed on an external display, and wherein the operating state of the timer is indicated by an indicia on at least one of the timer mechanism display or the external display.

7. An apparatus for timing competitions comprising:
a timer mechanism comprising a display operable to indicate an elapsed time, and a plurality of triggers; and a switch configurable to
select between a plurality of operating modes;
wherein the plurality of triggers comprises at least four spaced apart triggers; wherein the timer mechanism is configured to operate in at least a first operating mode in response to a first activation of said switch and a second operating mode in response to a second activation of said switch, wherein in the first operating mode, a first activation of the at least four triggers starts a timer and a second activation of the at least four triggers stops the timer, wherein the first activation and the second activation require substantially simultaneous contact with the at least four triggers; and in the second operating mode, a first activation of at least two of the at least four triggers starts a timer and a second activation of the at least two of the at least four triggers stops the timer, wherein the first activation and the second activation require substantially simultaneous contact with the at least two of the at least four triggers.

8. The apparatus of claim 7, wherein at least one trigger comprises a pressure sensitive switch, a capacitive switch, a photo optic or photo electric switch, or a dry contact switch.

9. The apparatus of claim 7, wherein the timer mechanism comprises at least one female aperture operable to receive at least one male extension.

10. The apparatus of claim 7, wherein said timer mechanism is substantially symmetrical with respect to a first axis, and said timer mechanism comprises two lobes extending horizontally from said first axis; and wherein the plurality of triggers comprises a first trigger on a first surface of a first lobe, a second trigger on a second surface of said first lobe, a third trigger on a first surface of a second lobe, and a fourth trigger on a second surface of said second lobe.

11. The apparatus of claim 7, wherein the timer mechanism comprises a microprocessor, an LCD display, a plurality of light emitting diodes, a reset switch, a power switch, and a power source.

12. The apparatus of claim 7, wherein the timer mechanism is configured to operate in a plurality of operating states, and the timer mechanism comprises a multi-color light emitting diode for indicating one of a plurality of operating states of the timer mechanism.

13. The apparatus of claim 12, wherein the timer mechanism comprises a data port enabling data associated with the timer mechanism to be displayed on an external display, and wherein the operating state of the timer is indicated by an indicia on at least one of the timer mechanism display or the external display.

14. A method of timing a competition, the method comprising:
providing a timer mechanism lying flat on a surface, said timer mechanism comprising a display operable to indicate an elapsed time, and a plurality of triggers, wherein the plurality of triggers comprises at least four spaced apart triggers, wherein the display is operatively connected to the plurality of triggers and the triggers are operable to control the display;
physically contacting a first trigger with at least one finger of a first hand;
physically contacting a second trigger with a thumb of said first hand;
physically contacting a third trigger with at least one finger of a second hand; and physically contacting a fourth trigger with a thumb of said second hand;
wherein said timer mechanism is substantially symmetrical with respect to a first axis, and
said timer mechanism comprises two lobes extending horizontally from said first axis;
and wherein the plurality of triggers comprises a first trigger on a first surface of a first lobe, a second trigger on a second surface of said first lobe, a third trigger on a first surface of a second lobe, and a fourth trigger on a second surface of said second lobe.

15. The method of claim 14, further comprising operating a switch to place the timer mechanism in one of a plurality of operating states, and causing a multi-color light emitting diode to indicate one of a plurality of operating states of the timer.

16. The method of claim 15, further comprising connecting the timer mechanism to an external display via a data port disposed within the timer mechanism, and enabling data associated with the timer mechanism to be displayed on the external display, and wherein the operating state of the timer is indicated by an indicia on at least one of the timer mechanism display or the external display.

* * * * *